Patented June 22, 1948

2,443,956

UNITED STATES PATENT OFFICE 2,443,956

METHOD FOR PRODUCING FREE-FLOWING CRYSTALLINE SULFADIAZINE

George Elisha Hall, Jr., Fort Bragg, N. C., and Martin Everett Hultquist and Leonard Henry Dhein, Bound Brook, N. J., assignors to American Cyanamid Company, New York, N. Y., a corporation of Maine No Drawing. Application May 13, 1942, Serial No. 442,816

3 Claims. (Cl. 260—239.6)

This invention relates to a method of producing 2-sulfanilamidopyrimidine in free flowing crystalline form.

2-sulfanilamidopyrimidine has achieved a tremendous success as a chemotherapeutic agent and is usually referred to as sulfadiazine. In the commercial processes of producing sulfadiazine in purified form, the crude product is dissolved as an alkali or alkaline earth salt in aqueous medium, and after clarification the sulfadiazine itself is precipitated by neutralization with a mineral or strong aqueous organic acid as for example hydrochloric acid and/or acetic acid. The product while chemically pure and of satisfactory physical properties for tableting tends to precipitate in fine fluffy crystalline form which presents a serious problem when used for surgical purposes because of its tendency to pack or cake in the wound and inability to introduce the product into deep wounds.

As an alternative to the purification in aqueous medium some attempts have been made to utilize organic solvents but these procedures are not commercially useful because of the low solubility of sulfadiazine in common organic solvents and because of the tendency to crystallize in needle form.

According to the present invention we have found that the disadvantages of sulfadiazine powder prepared in the past may be overcome and a free flowing fine crystal product can be obtained if the precipitation from aqueous solution takes place very slowly without introducing strongly acidic anions into the solution. When neutralization takes place under these conditions, the crystal size can be controlled to give crystals which flow freely. The product thus obtained may be used for packing of wounds and other uses for which the ordinary powder product is not well adapted.

The slow neutralization without introduction of strong acidic anions may be effected by two general procedures. One involves the gradual addition of a weak acid instead of a strong mineral acid. The other involves solution of the crude sulfadiazine in ammonia or other volatile alkali instead of a non-volatile alkali such as sodium hydroxide. The solution may then be heated to drive off gradually the volatile alkali and slowly precipitate the sulfadiazine. The two types of processes give essentially the same results, namely a free flowing crystalline sulfadiazine.

When the procedure is used involving neutralization with an acid, the strength of the acid depends on the nature of the medium in which the neutralization takes place. When water is used which has a high ionizing power for the acid and a low solvent power for the sulfadiazine, the acid must be very weak in order to obtain the results of the present invention. Examples of such acids are carbonic acids. When, however, alcohol is used as a medium the solvent power for sulfadiazine is greater and the ionizing effect on the acid is less and therefore a somewhat stronger organic acid may be used such as for example acetic acid.

The invention is not particularly concerned with the nature of the weak acid used in neutralizing or the volatile alkali so long as materials are used which do not present danger of contamination of the product with small amounts of toxic substances. Because of their cheapness carbon dioxide or dilute acetic acid in alcohol present commercial advantages, but other organic acids of the aliphatic series such as formic, propionic, butyric, succinic and the like may be used with alcohol as a solvent or aromatic acids such as benzoic acids may be employed in the same way. Ammonia is by far the most satisfactory volatile alkali, but similar results may be obtained with other volatile alkalies such as for example methylamine. Preferably reduced pressure is employed to remove the base from solution more rapidly although the invention is not limited thereto.

The invention will be described in greater detail in conjunction with the following specific examples which are typical illustrations of the invention. The parts are by weight.

Example 1

200 parts of sulfadiazine were dissolved in a mixture of 150 parts of 28% ammonia and 150 parts of water. This solution was diluted to 2000 parts with water, 10 parts of a decolorizing carbon were added and the solution was clarified after standing 15 minutes.

The clear colorless solution was then distilled under 40–80 mm. pressure at 60–65° C. until a test of the solution showed no color on phenolphthalein test paper. The resulting slurry of crystalline sulfadiazine was cooled to 25°, filtered and washed with water. On drying, there was obtained 178 parts colorless crystalline sulfadiazine having a melting point of 255.5–256.2° C. A screen test showed 67.5% of the material to be retained on a 60 mesh screen.

Precipitation by addition of sulfuric acid to a pH of 5–6 gave 13.5 parts recovered sulfadiazine.

The total sulfadiazine obtained amounted to 191.6 parts, or 95.8% of the starting material.

*Example 2*

300 parts sulfadiazine was dissolved in 2775 parts of water and 225 parts of 28% ammonia. 15 parts of decolorizing carbon was added and the solution clarified after ½ hour at 25° C. giving a colorless solution. The solution was heated to 45° C. and a stream of carbon dioxide was passed through at 40–45° for 70 minutes to give a heavy slurry of coarse crystalline sulfadiazine. The slurry was cooled to 25° C. under agitation and addition of carbon dioxide. The solution no longer gave a red spot on phenolphthalein test paper. After filtering and drying there was obtained 284 parts of colorless crystals or 94.7% of the starting material. A screen test showed 28% of the material to be 40–80 mesh. There was recovered from the liquor 14.5 parts or 4.8% on acidification to a pH of 5–6.

*Example 3*

25 parts of sulfadiazine were dissolved in 225 parts of 60% ethyl alcohol containing 22.5 parts of 28% ammonia. To this were added 1.25 parts of a decolorizing carbon and the solution was clarified at 65–70° C.

The clear filtrate was heated to reflux and a stream of carbon dioxide was passed through for 1½ hours at which time the solution was no longer alkaline to phenolphthalein. After cooling to 25° C. the slurry was filtered, washed thoroughly with cold water and the colorless crystals were dried. There were obtained 23 parts or 92% of the starting material.

A screen test showed 68% of the material to be 40 to 80 mesh.

*Example 4*

20 parts of sulfadiazine were dissolved in 117 parts of 60% alcohol and 4 parts sodium hydroxide. To this solution at reflux was added dropwise a solution of 6 parts acetic acid in 60 parts 60% alcohol over one-half hour.

On filtering, washing and drying there were obtained 19.2 parts of practically colorless crystalline sulfadiazine. After grinding to go through a 40 mesh screen, a test showed 63% to be 40–80 mesh material.

*Example 5*

20 parts of sulfadiazine were dissolved in 180 parts of 60% alcohol containing 4 parts sodium hydroxide. This was treated with 1 part of decolorizing carbon heated to 70–75° C. and clarified to give a nearly colorless solution.

A stream of carbon dioxide was passed through the solution while cooling gradually over a period of 2 hours at 25° C. After filtering, washing and drying there was obtained 17.3 parts of colorless crystals.

We claim:

1. A method of producing free flowing crystalline 2-sulfanilamidopyrimidine which comprises dissolving crude 2-sulfanilamidopyrimidine in an aqueous solution of a volatile base to form the salt of the 2-sulfanilamidopyrimidine, decolorizing the solution, heating the solution until the volatile base has been set free, removing the free base and recovering the 2-sulfanilamidopyrimidine by filtration.

2. A method according to claim 1 in which the removal of the volatile base is effected under reduced pressure.

3. A method according to claim 1 in which the crude sulfanilamidopyrimidine is dissolved in the form of its ammonium salt and the solution is heated to set free and volatilize the ammonia.

GEORGE ELISHA HALL, Jr.
MARTIN EVERETT HULTQUIST.
LEONARD HENRY DHEIN.

REFERENCES CITED

The following references are of record in the file of this patent:

UNITED STATES PATENTS

| Number | Name | Date |
| --- | --- | --- |
| 2,132,178 | Mietzsch et al. | Oct. 4, 1938 |
| 2,161,741 | Gage | June 6, 1939 |
| 2,186,773 | Stuart | Jan. 9, 1940 |
| 2,259,222 | Ewins | Oct. 14, 1941 |
| 2,276,664 | Mietzsch | May 17, 1942 |

FOREIGN PATENTS

| Number | Country | Date |
| --- | --- | --- |
| 517,272 | Great Britain | Jan. 25, 1940 |
| 521,821 | Great Britain | May 31, 1940 |
| 848,175 | France | July 17, 1939 |

OTHER REFERENCES

1. Journal American Chemical Society, Aug. 1940, pages 1999–2002.
2. Journal American Chemical Society, Nov. 1941, pages 3028–3030.
3. Chambers et al., Journal American Med. Assoc., volume 119, pages 324–327 (1942).